UNITED STATES PATENT OFFICE.

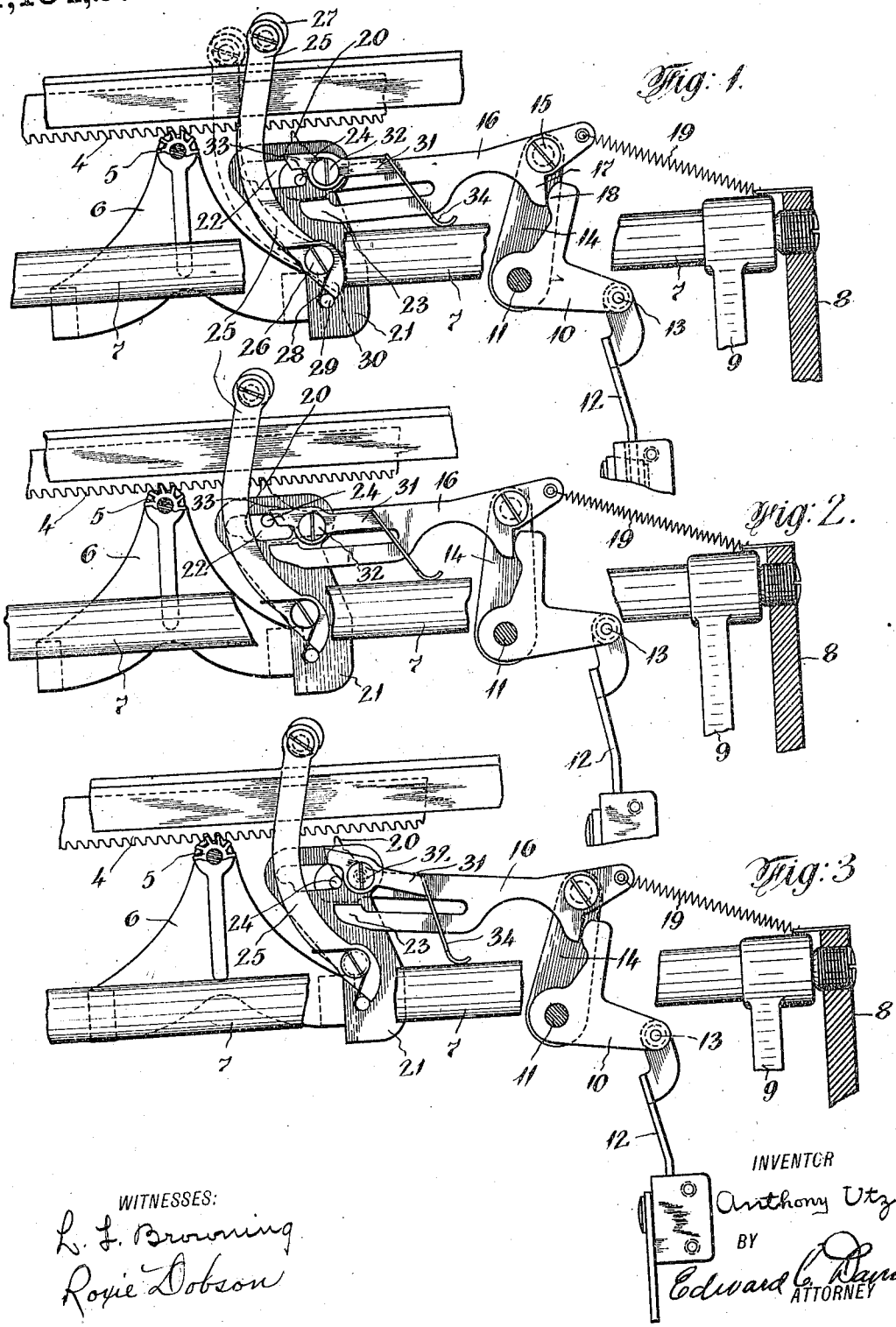

ANTHONY UTZ, OF HARTFORD, CONNECTICUT, ASSIGNOR TO ROYAL TYPEWRITER COMPANY, INC., OF NEW YORK, N. Y., A CORPORATION OF NEW YORK.

BACK-SPACING DEVICE FOR TYPE-WRITING MACHINES.

1,154,277.

Specification of Letters Patent.

Patented Sept. 21, 1915.

Application filed September 22, 1914. Serial No. 862,880.

*To all whom it may concern:*

Be it known that I, ANTHONY UTZ, a citizen of the United States of America, residing in Hartford, in the county of Hartford and State of Connecticut, have invented a new and useful Improvement in Back-Spacing Devices for Type-Writing Machines, of which the following is a specification.

The back spacing device for typewriting machines forming the subject of this invention is similar in its general characteristics to the device shown and described in the U. S. Letters Patent No. 1,009,514, of Edward B. Hess, dated November 21, 1911.

The object of this invention is to provide a structure that will insure the action of the back spacing pawl on the carriage feed rack in both the upper and lower case printing position of the carriage.

In the accompanying drawings: Figure 1 is a rear elevation of parts of a typewriting machine with the improved back space device applied thereto, showing the parts in position for lower case printing. Fig. 2 shows the back space pawl moved into engagement with a tooth of the rack; and Fig. 3 is a view similar to Fig. 1, showing the parts in position for upper case printing.

The rack 4, its coacting pinion 5 and pinion carrying bracket 6 are connected to the carriage and shift frame and move with them when the carriage is vertically shifted to change from one case printing to the other. The shift frame operating shaft 7, broken away to show some of the working parts more clearly, supported by suitable bearings on side parts 8 of the frame and one of the shift frame levers 9 are as used in the "Royal" typewriting machine, and though fragmentarily illustrated their functions and operations will be well understood.

The back spacing device comprises a bell crank lever 10 rocking on a shaft 11 and having an operating bar 12 connected at 13 to its horizontal arm. These parts are similar to the corresponding parts of the before-mentioned patent, and bar 12 is connected to and actuated by a back space key as therein shown. On the shaft 11 is also fitted to rock an arm 14 on which is pivoted at 15, intermediate its ends, the pawl lever 16. A lug or extension 17 is formed on this lever below its fulcrum and against which the rounded bearing 18 at the end of the vertical arm of the bell crank lever 10 acts. A spring 19, connected between the short arm of the pawl lever 16 and frame 8, holds the lug 17 against the part 18 of the bell crank lever 10 and also acts to raise the end of the lever which carries the pawl 20. Attached to the bracket 6 is a plate 21 having a cam slot 22 formed at its upper part. The pawl end of lever 16 is slit and bent, one part, carrying the pawl 20, being behind the plate and the other part 23 in front of the plate 21. The pawl part behind the plate has a pin 24 extending into the cam slot 22. The rack locking arm 25 pivoted at 26 to the plate 21, substantially similar to the corresponding element of the before mentioned patent, is operated, when said lever is moved to set the rack 4 back, by the part 23 of pawl lever 16 and so brings a bearing piece 27 on the end of arm 25 in contact with, or close to, the upper surface of the rack 4 to hold the rack in operative relation with the pinion 5, as shown by the dotted lines Fig. 1. This bearing piece 27 is eccentrically held on the arm 25, thus providing means for its proper adjustment. A coil wire spring 28 on the stud of the pivotal connection 26 of the arm 25 has one end resting against the side of the arm and the other end against a pin 29 and acts to set and hold the arm in vertical position, with the pawl locked in inoperative position, leaving the rack free to be lifted clear of the pinion 5. The pin 29 is fixed in plate 21 and the tail 30 of arm 25 rests against this pin when the arm is vertical.

With the parts set for lower case printing and in normal position, the pin 24 of the lever 16 is at the lower right hand corner of the cam slot 22. Now, when the carriage is raised for upper case printing, it will be observed that the lever 16 will be, by change of angular position of pin 24, drawn partly forward (see Fig. 3) and so cause the pawl 20 to rise to engage a rack tooth with the pin 24 then at the upper edge of the slot 22. The operating rod 12 has to travel a greater distance than is required of it if the pin 24 had to be raised only from the lower to the upper edge of the slot 22 to set the pawl in a rack tooth space with the carriage in position for lower case printing, as in Fig. 1. To compensate for this increase in the preliminary movement of lever 16 for upper case printing a latch device 31 is provided.

This latch 31 is pivoted at 32 to the cam plate 21. It has a forward ledge 33 which overlaps the pin 24 and a downwardly extending tail piece 34 that rests on the carriage-shift shaft 7 (as shown in Fig. 1) with the carriage set for lower case printing so that the rod 12 must move substantially the same distance, by the action of the back space key, to set the pawl 20 in a tooth of the rack ready to set the rack backwardly the distance of a tooth space (as shown at Fig. 2) as it is moved to set the pawl in contact with the rack when the carriage is set for upper case printing. The latch 31 in the latter case rocks on its pivotal center with the tail piece 34 still resting on the shaft 7 and the ledge 33 moved away from the pin 24, as shown at Fig. 3. The completion of the movement of the rod 12 and back space key sets the rack 4 and carriage back one space in both lower and upper case printing position each time the back space key is depressed.

The position of the latch 31 is described as being controlled by its tail piece 34 resting on the shift shaft 7. Of course it will be understood that said tail piece may be arranged to act in conjunction with any part of a typewriting machine that is vertically stationary relatively to the up and down movement of the carriage in shifting for lower and upper case printing.

I claim:

1. A back spacing device for typewriting machines, comprising a bell crank lever, an operating rod connected to the end of its horizontally arranged member, an arm arranged to co-axially rock with the bell crank lever, a pawl lever pivotally connected to the end of the arm and having a downwardly extended lug against which the vertical member of the bell crank lever acts, a pin at the pawl end of the lever, a pawl on the lever adapted to engage the feed rack of the carriage and a plate vertically movable with the carriage relative to the stationary rocking center of the bell crank lever and the arm, and having a cam slot in which the pin extends.

2. A back spacing device for typewriting machines, comprising a bell crank lever, an operating rod connected to the end of its horizontally arranged member, an arm arranged to co-axially rock with the bell crank lever, a pawl lever pivotally connected to the end of the arm and having a downwardly extended lug against which the vertical member of the bell crank lever acts, a pin at the pawl end of the lever, a pawl on the lever adapted to engage the feed rack of the carriage and a plate vertically movable with the carriage relative to the stationary rocking center of the bell crank lever and the arm, and having a cam slot in which the pin extends, a latch pivoted to the cam-slot plate having its tail end controlled by acting on a stationary part of the machine and a ledge at its other end adapted to overlap a part of the cam slot, whereby the pin of the pawl lever is, during the first part of its movement, controlled with the carriage in lower case printing position and left free with the carriage set for upper case printing.

3. A back spacing device for typewriting machines, comprising a bell crank lever, an operating rod connected to the end of its horizontally arranged member, an arm arranged to co-axially rock with the bell crank lever, a pawl lever pivotally connected to the end of the arm and having a downwardly extended lug against which the vertical member of the bell crank lever acts, a pin at the pawl end of the lever, a pawl on the lever adapted to engage the feed rack of the carriage, a spring connected to the other end of the pawl lever and a plate vertically movable with the carriage relative to the stationary rocking center of the bell crank lever and the arm, and having a cam slot in which the pin extends.

4. A back spacing device for typewriting machines, comprising a bell crank lever, an operating rod connected to the end of its horizontally arranged member, an arm arranged to co-axially rock with the bell crank lever, a pawl lever pivotally connected to the end of the arm and having a downwardly extended lug against which the vertical member of the bell crank lever acts, a pawl at one end of the lever adapted to engage the teeth of the carriage rack and means for holding the pawl away from the rack during the first part of the feeding movement of the lever when the carriage is set for lower case printing and inoperative when the carriage is set for upper case printing.

5. In a typewriting machine, a back space pawl adapted to act on the carriage feed rack, means for actuating the pawl to set the carriage back and means for preventing the pawl from engaging with the rack during the first part of its forward feeding movement when the carriage is in lower case printing position and leaving the pawl free to act when the carriage is in upper case position.

In testimony whereof, I have hereunto subscribed my name.

ANTHONY UTZ.

Witnesses:
LILLIAN I. KINGHORN,
F. H. VAN ARSDALL.